though the molten copper is stirred by the introduction of the inert gas. The rapidity of the deoxidation and the extent thereof increases with increased intensity of the stirring action.

2,741,557
PROCESS FOR THE DEOXIDATION OF COPPER

Rudolf Wolf, Hamburg, Germany, assignor to Norddeutsche Affinerie, Hamburg, Germany No Drawing. Application January 30, 1953, Serial No. 334,349

Claims priority, application Germany February 4, 1952

5 Claims. (Cl. 75—76)

The present invention relates to an improved process for deoxidizing copper and copper alloys and, more particularly, to a deoxidizing process to replace the so-called "poling" procedure.

The melting and refining of copper often involves blowing air into the molten metal to remove impurities contained therein. However, such blowing operation also results in conversion of certain proportions of copper to cuprous oxide which should be removed. For example, in the melting of copper cathodes in the usual reverberatory furnaces, the sulfur, hydrogen and other gases absorbed by the metal are subsequently removed by blowing air through the molten metal until a certain proportion is converted to cuprous oxide. Subsequently, the oxide content is normally lowered by a "poling" operation which involves covering the molten copper with charcoal and forcing green wood poles under the surface.

Many attempts have been made to replace the charcoal and the green wood poles, which are commonly employed in "poling" copper by other agents. For example, it has been proposed to introduce coal dust, oil, other suitable hydrocarbons, reducing gases or cuprous oxide reducing slags into the molten copper for this purpose, but really satisfactory results were not obtained with such means. It is also customary in the use of any deoxidizing agent to employ a reducing flame for heating. Nevertheless, the possible effect of the furnace atmosphere has previously not been fully recognized.

It has now been unexpectedly found according to the invention that a suitable deoxidation of copper can be achieved without the aid of other deoxidizing agents such as green wood poles, wood charcoal, oil and the like if the molten copper is subjected to a furnace atmosphere having a minimum reducing action, expressed by its content in carbon monoxide and hydrogen and simultaneous passing an inert gas, preferably steam, through the molten metal so that an intensive renewal of its uncovered upper surface in direct contact with the reducing furnace atmosphere is effected.

It was found, for example, that in this manner, it was possible to deoxidize copper to an oxygen content below 0.001% without the aid of reducing agents other than the reducing atmosphere employed in the furnace. It was found that a carbon monoxide and hydrogen content in the reducing atmosphere of at least 5% is necessary to instigate the deoxidation sufficiently rapidly for practical purposes. With increase in carbon monoxide and hydrogen content of the reducing atmosphere over this value, the deoxidizing rapidly increases. For example, molten copper, when treated according to the invention, employing a reducing atmosphere containing 6 to 7% of $CO+H_2$, will reduce the oxygen content to about 0.02% after a certain period of time, and when employing a reducing atmosphere containing about 10% of $CO+H_2$, the oxygen content will be reduced to below 0.001% in the same period of time, the other conditions being the same. The rapidity with which the deoxidation proceeds also is dependent upon the intensity with which the molten copper is stirred by the introduction of the inert gas. The rapidity of the deoxidation and the extent thereof increases with increased intensity of the stirring action.

The process according to the invention, therefore, relates to a process for the deoxidation of molten copper or copper alloys, in which the deoxidation is effected by the action of a reducing furnace atmosphere containing at least 5% of $CO+H_2$, that is, the sum of the CO and $H_2$ must be at least 5% disregarding the proportions of such gases, and preferably at least 6 to 7% upon the uncovered surface of the molten copper or copper alloy, which surface is continuously renewed by the intensive stirring action achieved by the introduction of an inert gas such as steam.

The process according to the invention can be carried out in the customary reverberatory furnaces employing a fluid fuel such as gas or oil, and adjusting the combustion of the fuel so that the desired reducing atmosphere results. It was found, however, that reverberatory furnaces employing pulverized coal are the only fuel are not very satisfactory, as when the combustion is adjusted to provide the reducing atmosphere required, the ash produced tends to settle on the molten metal and contaminate it. However, it was found that pulverized coal could be employed according to the invention if gas or oil is additionally employed as a fuel, for example, by providing oil or gas burners in the reverberatory furnace in addition to the pulverized coal burners, and adjusting the quantity of air supplied to the coal burners to that just sufficient for the complete combustion of the coal, and adjusting the quantity of air supplied to the gas or oil burners to a quantity sufficiently low that incomplete combustion results, and the combined combustion gases provide the necessary reducing atmosphere containing at least 5% of $CO+H_2$. It was found that the quantity of air thus supplied to the coal burners was sufficient to prevent the resulting ashes from settling upon the molten metal before the combustion gases leave the furnace.

The following examples will serve to illustrate the manner in which the process, according to the invention, can be carried out:

Example 1

200 tons of molten copper having an $O_2$ content of 0.9% were treated for 2 hours in an oil fired reverberatory furnace in which the oil burners were adjusted to provide a reducing atmosphere in the furnace containing 9 to 10% of $CO+H_2$ while such molten metal was stirred by the introduction of steam at 0.8 atmosphere gauge pressure through ten tubes ¾ inch in diameter. After the two hours' treatment, the oxygen content was 0.05%. Similar results were obtained when employing combined pulverized coal and oil firing as described above.

Example 2

5 tons of molten copper havning an $O_2$ content of 0.9% were treated in a smaller furnace in the same manner as in Example 1, except that this time the steam was introduced into the molten metal through one tube ¾ inch in diameter. After one hour's treatment, the oxygen content of the copper had already been reduced to below 0.001%. The difference in the degree and rapidity of the deoxidation achieved is caused by the fact that, in this instance, one tube is provided for the introduction of steam into 5 tons of the molten metal, whereas one tube per 20 tons of metal was provided in Example 1, with the attendant difference in the intensity of the stirring of the molten metal during the treatment.

I claim:

1. A process for deoxidizing oxygen containing molten copper and copper alloys, which comprises maintaining the molten metal in a furnace under a reducing atmosphere containing at least 5% of $CO+H_2$ and in direct contact therewith, while simultaneously introducing an inert gas into the molten metal to effect intensive stirring thereof.

2. A process for deoxidizing oxygen containing molten copper and copper alloys, which comprises maintaining the molten metal in a furnace under a reducing atmosphere containing at least 6 to 7% of $CO+H_2$ and in direct contact therewith, while simultaneously introducing an inert gas into the molten metal to effect intensive stirring thereof.

3. A process for deoxidizing oxygen containing molten copper and copper alloys, which comprises maintaining the molten metal in a furnace under a reducing atmosphere containing at least 5% of $CO+H_2$ and in direct contact therewith, while simultaneously introducing steam into the molten metal to effect intensive stirring thereof.

4. A process for deoxidizing oxygen containing molten copper and copper alloys, which comprises burning a fuel over said molten metal to provide a reducing atmosphere containing at least 5% of $CO+H_2$ over said molten metal and in direct contact therewith, while simultaneously introducing an inert gas into the molten metal to effect intensive stirring thereof.

5. A process for deoxidizing oxygen containing molten copper and copper alloys, which comprises burning pulverized coal over the molten metal with just sufficient air for the complete combustion thereof, and simultaneously burning a fluid fuel over said molten metal with an insufficient quantity of air for the complete combustion thereof, the combined combustion of said pulverized coal and fluid providing a reducing atmosphere containing at least 5% of $CO+H_2$ over said molten metal and in direct contact therewith, while simultaneously introducing an inert gas into the molten metal to effect intensive stirring thereof.

References Cited in the file of this patent

UNITED STATES PATENTS

| | | |
|---|---|---|
| 1,756,967 | Alexander | May 6, 1930 |
| 2,058,947 | Betterton | Oct. 27, 1936 |